United States Patent [19]

Rupprecht et al.

[11] Patent Number: 4,838,371

[45] Date of Patent: Jun. 13, 1989

[54] CONSTRAINED LINEAR MOTION INERTIAL BALANCE

[75] Inventors: Georg Rupprecht; Harvey Patashnick, both of Voorheesville, N.Y.

[73] Assignee: Rupprecht & Patashnick Co., Inc., Albany, N.Y.

[21] Appl. No.: 147,252

[22] Filed: Jan. 22, 1988

[51] Int. Cl.⁴ .......................... G01G 3/14; G01G 21/24
[52] U.S. Cl. ................................ 177/210 FP; 177/255
[58] Field of Search .......................... 177/210 FP, 255

[56] References Cited

U.S. PATENT DOCUMENTS

| | | | |
|---|---|---|---|
| 2,694,310 | 11/1954 | Pounds | 177/210 FP |
| 3,926,271 | 12/1975 | Patashnick . | |
| 3,938,603 | 2/1976 | Shoberg et al. . | |
| 4,158,395 | 6/1979 | Brown | 177/210 FP |
| 4,274,501 | 6/1981 | Gallo et al. . | |
| 4,344,495 | 8/1982 | Kovacs | 177/255 X |
| 4,391,338 | 7/1983 | Patashnick et al. . | |
| 4,405,024 | 9/1983 | Fraval et al. | 177/210 FP |
| 4,429,574 | 2/1984 | Barry et al. | 177/210 FP |

*Primary Examiner*—George H. Miller, Jr.
*Attorney, Agent, or Firm*—Heslin & Rothenberg

[57] ABSTRACT

A suspension system for an inertial balance constrains the weighing platform when oscillated to undergo uniform linear motion, thereby ensuring high measurement accuracy. The suspension system includes a supporting framework and a first plurality of elongate elastic support members for suspending the weighing platform from the supporting framework. The elongate support members are disposed in a common plane when the weighing platform is at rest and their inner ends intersect at a first common point to which the weighing platform is firmly linked. A second plurality of such elongate support members is similarly disposed in a second common plane parallel to but spaced from the first common plane. A stiff connecting rod joins the intersection points of the two pluralities and also serves to support the weighing platform and, in conjunction with a feedback system, serves to induce and maintain the weighing platform in oscillation at a resonant frequency dependent upon mass loading. The elongate support members preferably operate in a bending mode, are hollow, and are constructed of a material having a temperature independent Young's modulus over the operating temperature range of the inertial balance. The elongate support members may also be tapered and/or have an elongated, e.g. elliptical or rectangular cross-sectional configuration. Provision is also made to allow fluid flow from the weighing platform to an outlet on the supporting framework, and to effectively fix the center of mass of the moving portion of the balance to thereby minimize damping losses to the outside.

21 Claims, 5 Drawing Sheets

CONSTRAINED LINEAR MOTION INERTIAL BALANCE

BACKGROUND OF THE INVENTION

1. Technical Field

This invention relates generally to inertial balances used to measure mass and more particularly, to a suspension system for an inertial balance which improves the measurement accuracy of such instruments.

2. Background Art

Inertial balances can measure mass in the absence of gravity and are therefore especially well suited for applications in space and also in industrial situations where gravitational balances are not practical. An inertial measurement device relates the force on a sample to the acceleration experienced by the sample in order to determine its mass. As a practical matter, most inertial balances induce force and acceleration by vibrational means.

U.S. Pat. No. 3,926,271 describes one such inertial balance in which a free end of a tapered tubular element, which is clamped at its other end, is oscillated along an arc to determine the mass of a specimen supported on the free end. The specimen's mass is determined by measuring the resonant frequency of the tapered tubular element which changes in accordance with the mass loading. This earlier developed inertial balance is characterized by extremely high sensitivity and accordingly has been widely used as a microbalance, i.e. to measure the mass of small particles. An adaption of the instrument to measure the mass of matter suspended within a fluid medium is described in U.S. Pat. No. 4,391,338.

Although the tapered element oscillating microbalance described above exhibits high sensitivity, its measurement accuracy is limited. In such an instrument, sensitivity depends upon how much frequency shift is obtained for a certain change in sample mass. Accuracy, on the other hand, relates to the correlation between the results provided by the instrument in comparison to an established standard weight, e.g. one traceable to the National Bureau of Standards. The low mass and particular configuration of the earlier developed instrument results in its high sensitivity. Unfortunately, however, a displacement of the center of mass of the object being weighed can introduce an error in the measurement results. In other words, a simple reorientation of a test sample on the weighing platform can produce a different mass reading. This loss of accuracy due to displacement errors, is not especially significant when measuring small particles but becomes a major concern as the size of the sample increases. Moreover, this problem appears to be endemic to presently available inertial balances.

U.S. Pat. No. 4,158,395 relates to a "Weighing Device Using a Resonant Mass-Spring System" in which attempts are made to limit movement of an oscillating measurement platform to one degree of freedom. The measurement platform is suspended by two pairs of flexible struts anchored to a relatively heavy intermediate mass located on one side of the measurement platform. The intermediate mass is itself suspended by struts intended to allow it to move substantially in only one degree of freedom. The relatively heavy intermediate mass acts as a damping reduction system to minimize energy loss from the oscillating measurement platform. In practice, the one-sided suspension system for the measurement platform, described in this patent, causes the sample to move along an arc and introduces measurement errors and a mass resolution uncertainty.

A need therefore persists for an inertial balance which exhibits high measurement accuracy with reasonable sensitivity and resolution.

SUMMARY OF THE INVENTION

In accordance with the principles of the present invention, this need is satisfied and the deficiencies of the prior art are overcome, by the provision of a suspension system which constrains an oscillating weighing platform to undergo uniform linear motion. In its preferred form, the suspension system includes a supporting framework, and a first plurality of elongate support members, attached at their outer ends to said framework for suspending the weighing platform. The inner ends of said support members converge toward a first common point and the support members are advantageously disposed symmetrically about said first common point. The weighing platform is mounted to move in concert with said first point. The support members lie in a first common plane when the weighing platform is at rest and this plane is perpendicular to the direction along which the weighing platform is induced to oscillate. The so constructed suspension system serves to constrain the movement of the oscillating platform to uniform linear motion along this direction.

In a preferred embodiment, four support members, spaced 90° apart are disposed in the first common plane. The support members are elastic and operate primarily in a bending mode. The support elements are also preferably hollow and constructed of a glass material having a substantially temperature independent Young's modulus over the operating temperature range of the inertial balance. Additionally, the support members may be tapered and/or have an elliptical, rectangular or other elongated cross-sectional configuration.

In another aspect of the invention, a second plurality of elongate support members, disposed in a second common plane when the platform is at rest are provided. The second common plane is parallel to and spaced from the first common plane and the support members in this second common plane also each have an outer end secured to said framework and an inner end which converges toward a second common point. A stiff center rod preferably connects the first and second common points and also supports the weighing platform and facilitates inducement and maintenance of oscillation of the weighing platform at a resonant frequency dependent upon mass loading. Additional support struts may be provided between the center rod and the weighing platform to further stabilize the latter.

In another aspect of the invention, each support member may be attached near its outer end to the framework by an associated support rod which is orthogonal to said member and coplanar with said member when the platform is at rest. An extension is provided on each of the support members extending radially outward beyond the associated support rod and a counterweight is attached to each such extension. The counterweights serve to maintain the center of mass of the weighing platform and suspending means fixed with respect to the supporting framework during platform oscillation.

In a further aspect of the invention, the supporting framework may be provided with a fluid port and at least a portion of the center rod, a support member and a portion of the framework are hollow and interconnected to provide a continuous fluid flow path from the weighing platform to said port. In this configuration, the weighing platform can comprise a fluid permeable filter.

Accordingly, a principal object of the present invention is to improve the measurement accuracy of inertial balances.

Another object of this invention is to provide an improved suspension system for a frequency dependent mass measuring unit.

Yet another object of the present invention is to ensure the achievement of uniform linear motion at the weighing platform of an inertial balance.

A further object is to provide an inertial balance which allows use of filters at the weighing platform or allows samples to be held on the platform by a pressure differential.

A still further object is to provide a design for an accurate inertial balance which can be tailored to: reduce susceptibility to higher order vibrational modes, to reduce the moving mass of the balance and thereby increase its sensitivity, to minimize damping losses to the outside, and/or to produce a more temperature stable system.

Still another object is to provide a highly accurate mass measuring instrument which can be constructed readily and cost effectively and which is susceptible to wide application.

BRIEF DESCRIPTION OF THE INVENTION

These and other objects, features and advantages of the present invention will be more readily understood from the following detailed description when read in conjunction with the accompanying drawings in which.

DETAILED DESCRIPTION

The present invention is based upon the realization that the measurement accuracy deficiencies common to existing inertial balances results from the non-linear motion experienced by the sample on the weighing platform of such balances. To overcome this problem, the present invention constrains the oscillatory movement of the weighing platform, and accordingly the sample, to uniform linear motion. This approach produces a substantial improvement in the accuracy of the inertial balance.

Figure 1:
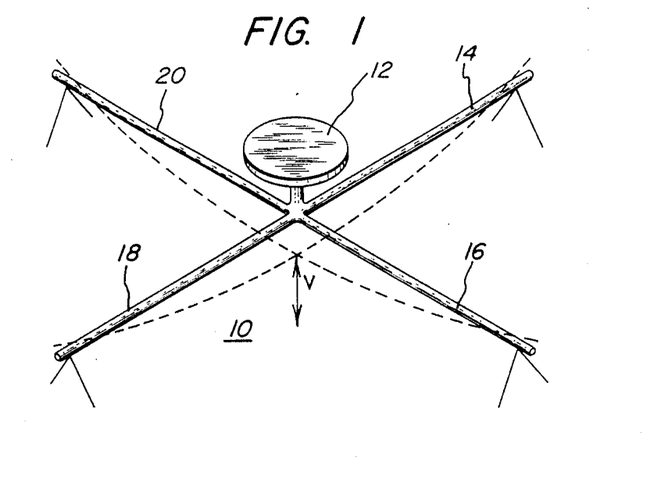
FIG. 1 is a schematic illustration of a first embodiment of an inertial balance suspension system of the present invention.

A first embodiment of a linear motion constraining suspension system for an inertial balance is shown, in simplified form, in FIG. 1. A sample table or weighing platform 12 is attached at the intersection of four symmetrically disposed, elongate, elastic support elements 14, 16, 18 and 20 arranged in a cross configuration or arrangement 10. As shown, the outer ends of the support members are, in turn, supported at equal distances from the intersection, in a manner which permits their operation in a bending mode (as indicated by the dashed lines). The four support members lie in a common plane when the weighing platform is at rest. A vibration of the platform is introduced in a direction perpendicular to the plane containing the support members, as indicated by double headed arrow V. As a result of the dynamic restrictions imposed by the symmetric arrangement of support members 14, 16, 18 and 20, the weighing platform 12 is constrained to undergo uniform linear motion.

The number, form and orientation of the support members in the suspension system may vary from that shown in FIG. 1 so long as the weighing platform 12 is constrained to experience uniform linear motion. It is possible, for example, to construct a symmetric suspension system with three or even two elongate support members. However, as the number of such members decreases, the possibility for the excitation of non-linear motion increases. This can be attenuated by using highly elliptical or flat elastic elements as the support members, as more fully discussed hereinafter. In some cases, it may even be possible to use a geometrically non-symmetric arrangement of the support members and still produce operational symmetry, i.e. substantially uniform linear motion of the weighing platform. A geometrically symmetrical arrangement of four identical support members spaced 90° apart is, however, presently preferred.

The mass measurement accuracy of a vibratory inertial balance is dependent upon the precision with which linear motion is maintained at the weighing platform undergoing oscillation. On the other hand, a high mechanical Q aids the mass resolution of the system. The moving mass of the measuring system determines its sensitivity because the lower the oscillating system mass the greater the shift in frequency for a given sample mass. The primary purpose of this invention is to maximize the mass measurement accuracy of an inertial balance. Further refinements, described in detail hereinafter, permit concurrent optimization of the instrument's resolution and sensitivity.

Figure 2:
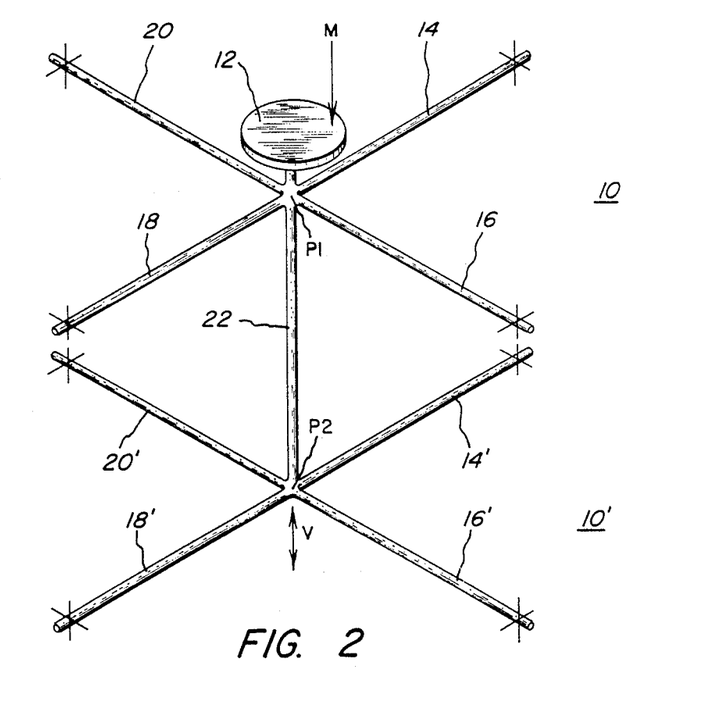
FIG. 2 is a simplified schematic illustration of a second embodiment of the suspension system of the present invention.

If the center of mass of a sample located on weighing platform 12 is coincident with an axis passing through the intersection point of the support members and running parallel to the direction of uniform motion of the platform, then it is sufficient to utilize a single arrangement of support members, as shown in FIG. 1, for platform suspension purposes. In most applications, however, one must anticipate that the center of mass "M" of the sample does not lie along this axis. As a result, a torque is produced which will interfere with the desired linear motion of the weighing platform. To overcome this problem, a cancellation of the torque can be achieved through the use of a stiff center rod constrained by a second arrangement 10' of elongate elastic support members 14', 16', 18' and 20', as shown in FIG. 2. The second constraining arrangement of support members may be identical to that of the first arrangement 10 or may assume any of the various alternative forms discussed herein. The support members of arrangement 10' are coplanar when the weighing platform 12 is at rest and intersect at a common point P2. The common plane of arrangement 10' is parallel to and spaced from the common plane of arrangement 10. Stiff center member 22 connects the common intersection point P2 of arrangement 10' to the common intersection point Pl of arrangement 10. As shown in FIG. 2, connecting member 22 extends along an axis which is parallel to the direction along which linear motion of the weighing platform occurs. Although this orientation is preferred, P2 could conceivably be offset with respect to Pl.

Figure 3:
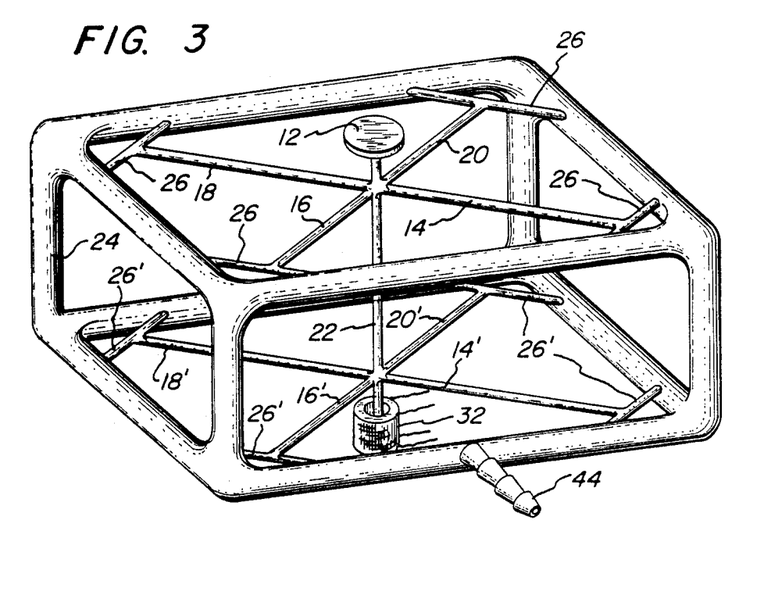
FIG. 3 is a perspective depiction of a presently preferred embodiment of the inertial balance of the present invention.

A preferred embodiment of a constrained linear motion inertial balance constructed in accordance with the principles of the present invention, is shown in FIG. 3. A supporting framework 24 provides overall structural support for the elongate support members that suspend weighing platform 12. The framework 24 may be made of any suitable material, e.g. glass or metal tubing and may take any of various forms, e.g. a rectangular structure as shown in FIG. 3. Similarly, weighing platform 12, employed to hold the sample whose mass is to be measured, may comprise a table, substrate, filter or the like, having various shapes and constructions depending upon the particular application.

Elongate elastic support members 14, 16, 18, and 20 are symmetrically disposed in a first cross configuration and lie in a first common plane when the weighing platform is at rest. Support members 14', 16', 18' and 20' are similarly arranged in a second cross configuration and lie in a second common plane when the weighing platform is at rest. This second common plane is parallel to but spaced from the first common plane.

Each support member of the first cross configuration (shown in the top of FIG. 3) is attached near its outer end to the framework 24 by an associated support rod 26 which is orthogonal to said member and coplanar with said member when the platform is at rest. The support members of the second cross configuration (shown near the bottom of FIG. 3) are similarly attached to framework 24 by rods 26'.

The intersections of the two cross configurations of support members are attached to each other by stiff center rod 22 which is orthogonal to the planes of the cross configurations when the weighing platform 12 is at rest. Center rod 22 extends above the upper cross configuration to hold weighing platform 12. The center rod may also extend below the lower cross configuration to allow for interaction with a position sensor and vibration drive of a feedback system that induces and maintains the oscillation of the measuring platform 12 through the action of center rod 22. A detector of the position sensor and a drive coil of the vibrational drive of the feedback system are preferably attached in a fixed position, by conventional means (not shown) to the supporting framework 24.

Figure 4:
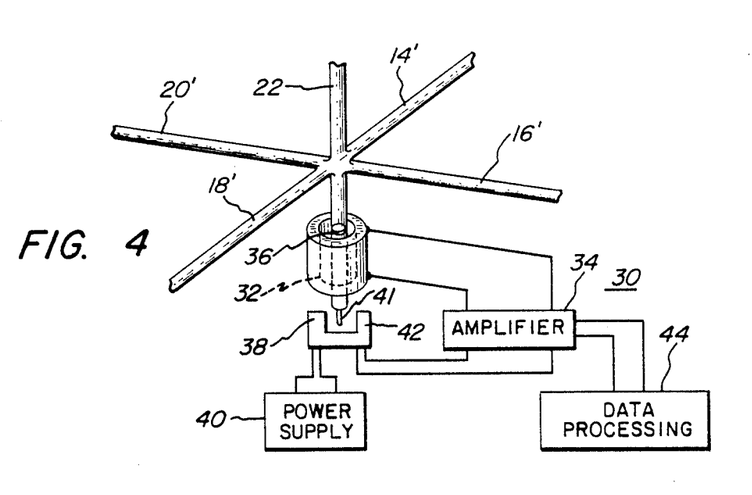
FIG. 4 is a depiction of a feedback system which can be advantageously employed with the inertial balance of the invention.

A typical feedback system 30 for use with a constrained linear motion inertial balance is shown in FIG. 4. A drive coil 32 powered through amplifier 34 interacts with a permanent magnet 36 secured to center rod 22 to induce vibration of rod 22 and attached weighing platform 12. An optical pickup, comprising, for example, a photodiode 38 energized from power supply 40 and a photodetector 42, interact with an opaque vane 41 attached to rod 22, to continually monitor the position of rod 22. An output signal from photodetector 42 is fed back to an amplifier 34 containing an automatic gain control for start-up and amplitude stabilization, and serves to ensure that rod 22 is maintained in oscillation at a resonant frequency dependent upon mass loading. A data processing unit 44 is connected to amplifier 34 and in known fashion determines changes in the resonant frequency of oscillation and indicates a corresponding mass loading of the weighing platform. Instead of the optical sensor unit, other motion detector devices, e.g. magnetic, can be used in the feedback system. Similarly, other vibration drive schemes may be employed and variations in the circuitry of the feedback system are contemplated. The drive and sensor elements of the feedback system may likewise be positioned to interact with other portions of rod 22.

Referring again to FIG. 3, the illustrated embodiment demonstrates the most important features for a sensitive and accurate inertial mass balance. Of prime importance is the achievement of uniform linear motion at the weighing platform 12. This linear motion is ensured by the constraints imposed by the symmetric arrangement of the elongate support members. As already discussed, the double cross arrangement serves to cancel any torque produced when the center of mass of the sample does not lie along the longitudinal axis defined by center rod 22.

Ideally, to achieve the highest sensitivity of the constrained linear motion inertial balance, the instrument is constructed such that the moving parts, i.e. the elongate support members, center rod and weighing platform, have as minimal mass as practical consistent with the stresses produced by the mass of the samples that are to be weighed.

In the embodiment shown in FIG. 3, as well as in the other figures, the oscillation of the weighing platform is accommodated and constrained to uniform linear motion by the bending of the elongate support members. Although other non-bending modes may be employed, bending is preferred because of the high stability, in regard to sideways displacement, afforded thereby.

A further refinement of the constrained linear motion inertial balance of the present invention can be achieved by utilizing hollow elongate support members. This has the advantage of reducing the moving mass of the balance, thereby increasing its sensitivity. It also has the advantage of allowing the transport of gases or other fluids through the support members. When combined with hollow end rods 26, 26', center rod 22 and a hollow supporting framework 24, a suction action can be provided at the weighing platform by attaching a pump (not shown) to a fluid port or outlet 44. This permits the use of filters at the weighing platform or the retention of samples on the platform by a pressure differential.

If the elongate support members have a Young's modulus which is temperature dependent, frequency changes will result with temperature changes even with constant mass. Accordingly, in accordance with the principles of the present invention, the elongate support members are preferably constructed from a material, for example, a glass, with a temperature independent Young's modulus over the operating temperature range of the inertial balance, thereby resulting in a more temperature stable system.

Figure 5:
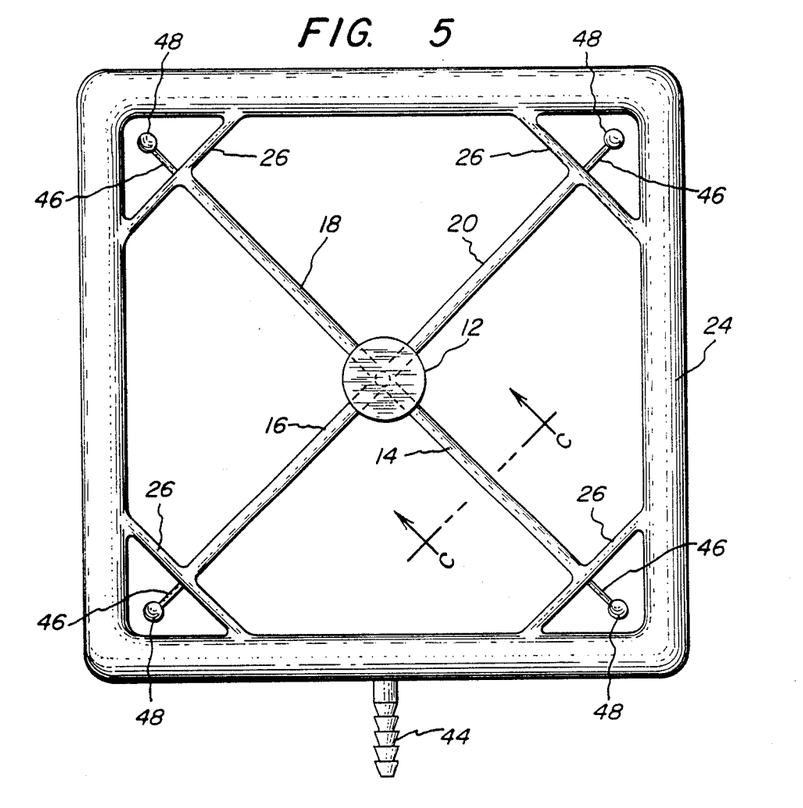
FIG. 5 is a plan view of a suspension system of the present invention employing counterweights.
Figure 5A:
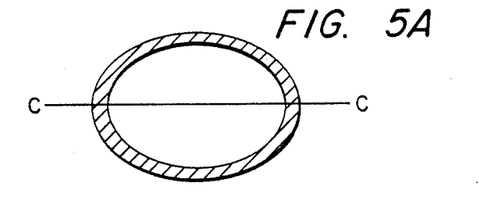
FIG. 5A is a cross-sectional view of one embodiment of a support member useful in the present invention.
Figure 5B:
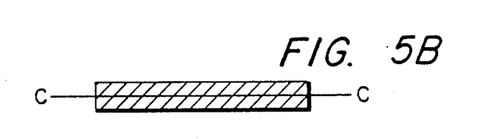
FIG. 5B is a cross-sectional view of a second embodiment of a support member useful in the present invention.

FIG. 5 presents a top plan view of an embodiment of the constrained linear motion inertial balance of the present invention incorporating several additional refinements. These include utilization of elongate support members having a cross-sectional configuration which is elongated along a direction perpendicular to the longitudinal axis of the member and the direction of linear motion of platform 12. By way of examples, FIG. 5A depicts a hollow elliptical cross-sectional configuration and FIG. 5B depicts a solid rectangular cross-sectional configuration. Such configurations provide a high mechanical constraint for the weighing platform with low restoring force for the vibration in comparison to circular cross section elements. This is particularly advantageous when lower resonant frequencies of linear motion inertial balances are desired such as when samples having low modulus of elasticity need to be measured.

Figure 6:
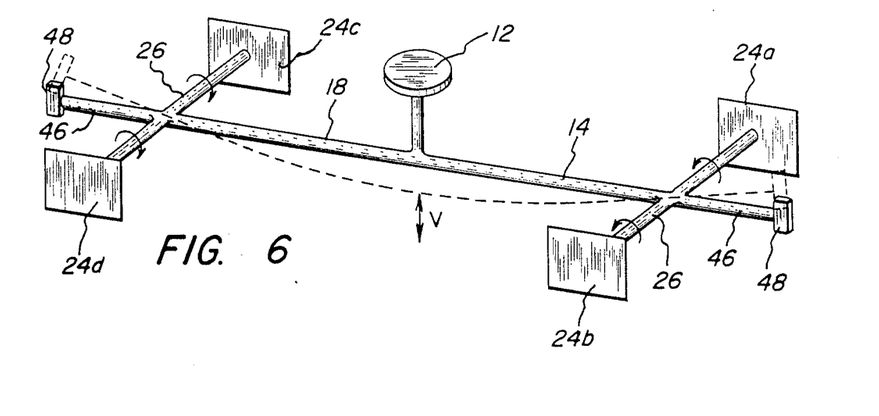
FIG. 6 is a schematic illustration useful in understanding a damping reduction feature of the present invention.

In a further modification, an extension 46 can be provided on each support member extending radially outward beyond the associate support rod 26, 26' and a counterweight 48 attached to each such extension. These counterweights are selected and employed to compensate for displacement of the center of mass of the moving portion of the inertial balance. As a result, during the vibration, the center of mass of the entire system stays fixed in respect to the supporting framework 24 and therefore no force is relayed through this framework to the outside world. Damping losses to the outside are thus minimized. This refinement is most effective for achieving high mass resolution for samples having masses that are a small fraction of the effective mass of the system's moving mass. FIG. 6 schematically illustrates how counterweights 48 on extensions 46 of one set of opposed elongated support members 14, 18 mounted by support rods 26 to rigidly interconnected framework sections 24a, 24b, 24c and 24d, operate to provide cancellation of torque and fixation of the center of mass of the moving portion of the balance.

Figure 7:
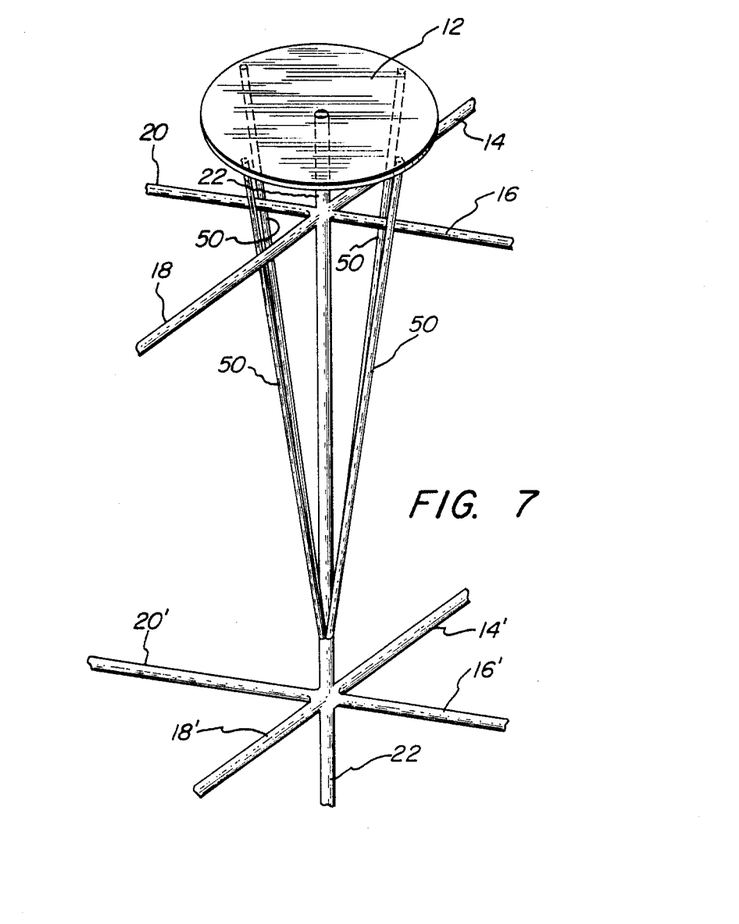
FIG. 7 is a partial perspective view of an optional strut structure for a weighing platform.

FIG. 7 illustrates a further refinement of the present invention in which a set of struts 50 can be connected between center rod 22 and the periphery or base of weighing platform 12 in order to provide additional support and stabilization to the platform.

Figure 8:
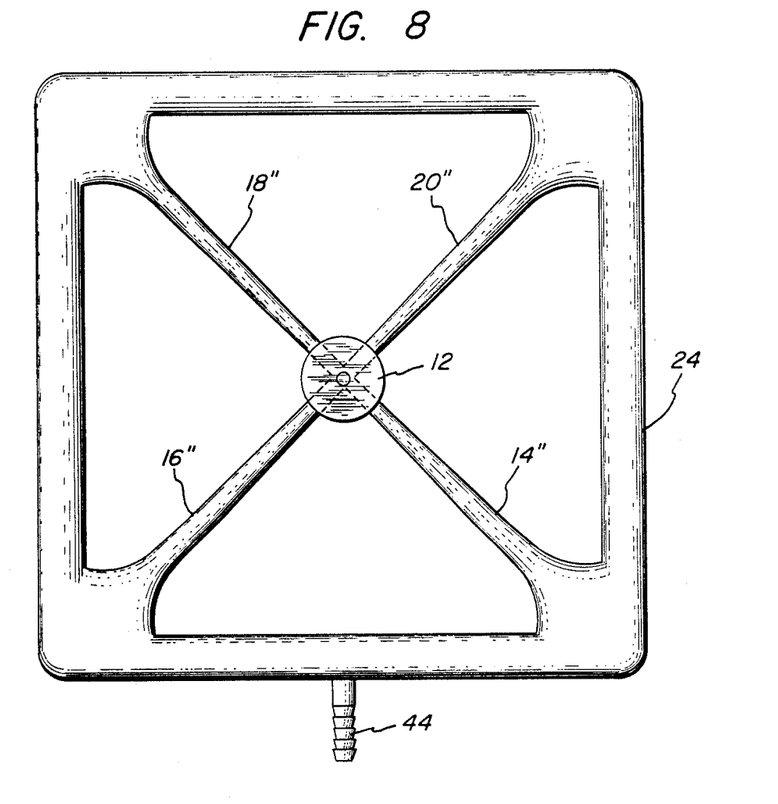
FIG. 8 is a plan view of an alternate embodiment of the suspension system of the present invention.

FIG. 8 depicts in plan view another refinement of the present invention in which the elongate support members 14", 16",18" and 20" are tapered from their outer ends (which can be directly connected to framework 24) towards their inner ends. This tapering reduces susceptibility to higher order vibrational modes and further reduces the moving mass of the balance.

From the foregoing, it will be apparent that a suspension system for inertial balances has been devised which significantly improves the measuring accuracy of such instruments and achieves the other objects set forth hereinbefore. Although various specific embodiments and refinements have been depicted and described, it will be evident to those skilled in this art that other modifications, substitutions, additions, combinations, etc. can be made without departing from the spirit of the invention, the scope of which is defined by the claims appended hereto.

What is claimed is;

1. A suspension system for an inertial balance in which a weighing platform is made to oscillate at a resonant frequency and changes in the resonant frequency of oscillation due to mass loading of the weighing platform are sensed, the suspension system comprising:

a supporting framework; and suspending means for suspending the weighing platform from the supporting framework in a manner which constrains the platform when oscillated to undergo uniform linear motion along a desired direction with respect to said framework, said suspending means applying restoring forces in directions orthogonal to said desired direction, which restoring forces are orders of magnitude greater than restoring forces applied by the suspending means in the desired direction, whereby platform motion is constrained to said desired direction.

2. The suspension system of claim 1 wherein the suspending means comprises a first plurality of n elongate rod-like support members, said support members each having an outer end which is secured to said framework and an inner end which converges towards a first common point.

3. The suspension system of claim 2 wherein the support members of said first plurality are disposed symmetrically about said first common point with adjacent members being spaced apart by 360/n degrees.

4. The suspension system of claim 3 wherein the support members of said first plurality are disposed in a first common plane when the weighing platform is at rest, said uniform linear motion is long a predetermined direction, and said first common lane is perpendicular to said predetermined direction.

5. The suspension system of claim 4 further comprising a second plurality of elongate support members disposed in a second common plane when the platform is at rest, said second common plane being parallel to and spaced from the first common plane, the support members of said second plurality each having an outer end secured to said framework and an inner end which converges towards a second common point; and stiff interconnecting means for interconnecting said first common point to said second common point.

6. The suspension system of claim 5 wherein said stiff interconnecting means comprise a stiff center rod rigidly secured between said first and second points, said center rod being parallel to said predetermined direction and supporting said weighing platform.

7. The suspension system of claim 6 further comprising vibration drive means and position sensor means interconnected in a feedback system, said feedback system cooperatively interacting with said center rod to induce and maintain said weighing platform in oscillation at a resonant frequency dependent mass loading.

8. The suspension system of claim 7 further comprising means connected to said feedback system for measuring changes in the resonant frequency of oscillation and for indicating a corresponding mass loading of the weighing platform.

9. The suspension system of claim 6 wherein said framework is provided with fluid port means, and at least a portion of said center rod, a support member and a portion of the framework are hollow and interconnected to provide a continuous fluid flow path from said weighing platform to said port means.

10. The suspension system of claim 9 wherein said weighing platform comprises fluid permeable filter means.

11. The suspension system of claim 6 wherein said first and second pluralities each comprise four support members disposed in radial symmetry about said center rod, and wherein all of said support members are hollow, elastic, operate primarily in a bending mode and are constructed of a material which is substantially temperature insensitive over the operating range of the inertial balance.

12. The suspension system of claim 11 further comprising at least one support strut connected between said center rod and the weighing platform.

13. The suspension system of claim 4 wherein said support members are elastic and operate primarily in a bending mode.

14. The suspension system of claim 13 wherein at least one of said support members tapers from its outer end towards its inner end.

15. The suspension system of claim 13 wherein one of said support members extends along a longitudinal axis and has a cross-sectional configuration which is elongated along a direction which is perpendicular to said longitudinal axis and said predetermined direction.

16. The suspension system of claim 15 wherein said one support member has a rectangular cross-sec configuration.

17. The suspension system of claim 15 wherein said one support member has an elliptical cross-sectional configuration.

18. The suspension system of claim 13 wherein at least of said support members is hollow.

19. The suspension system of claim 13 wherein said support members are composed of a material having a substantially temperature independent Young's modulus over the operating temperature range of the inertial balance.

20. The suspension system of claim 13 wherein each support member is attached near its outer end to the framework by an associated support rod which is orthogonal to said member and coplanar with said member when the platform is at rest.

21. The suspension system of claim 20 further comprising:
- an extension on each support member extending radially outward beyond the associated support rod; and
- a counterweight attached to each such extension, the counterweights serving to maintain the center of mass of the weighing platform and suspending means fixed with respect to the supporting framework during platform oscillation.

* * * * *

UNITED STATES PATENT AND TRADEMARK OFFICE
CERTIFICATE OF CORRECTION

PATENT NO. : 4,838,371

DATED : June 13, 1989

INVENTOR(S) : Rupprecht et al.

It is certified that error appears in the above-identified patent and that said Letters Patent is hereby corrected as shown below:

Column 3, line 48, insert --present-- between "the" and "invention".

Column 8, line 26, substitute --along-- for "long".

Column 8, line 27, substitute --plane-- for "lane".

Column 8, line 49, insert --upon-- between "dependent" and "mass".

Column 9, line 2, insert --temperature-- between "operating" and "range".

Column 9, line 19, substitute --cross-sectional-- for "cross-sec"

Signed and Sealed this

Sixth Day of March, 1990

*Attest:*

JEFFREY M. SAMUELS

*Attesting Officer*     *Acting Commissioner of Patents and Trademarks*